Figure 1:
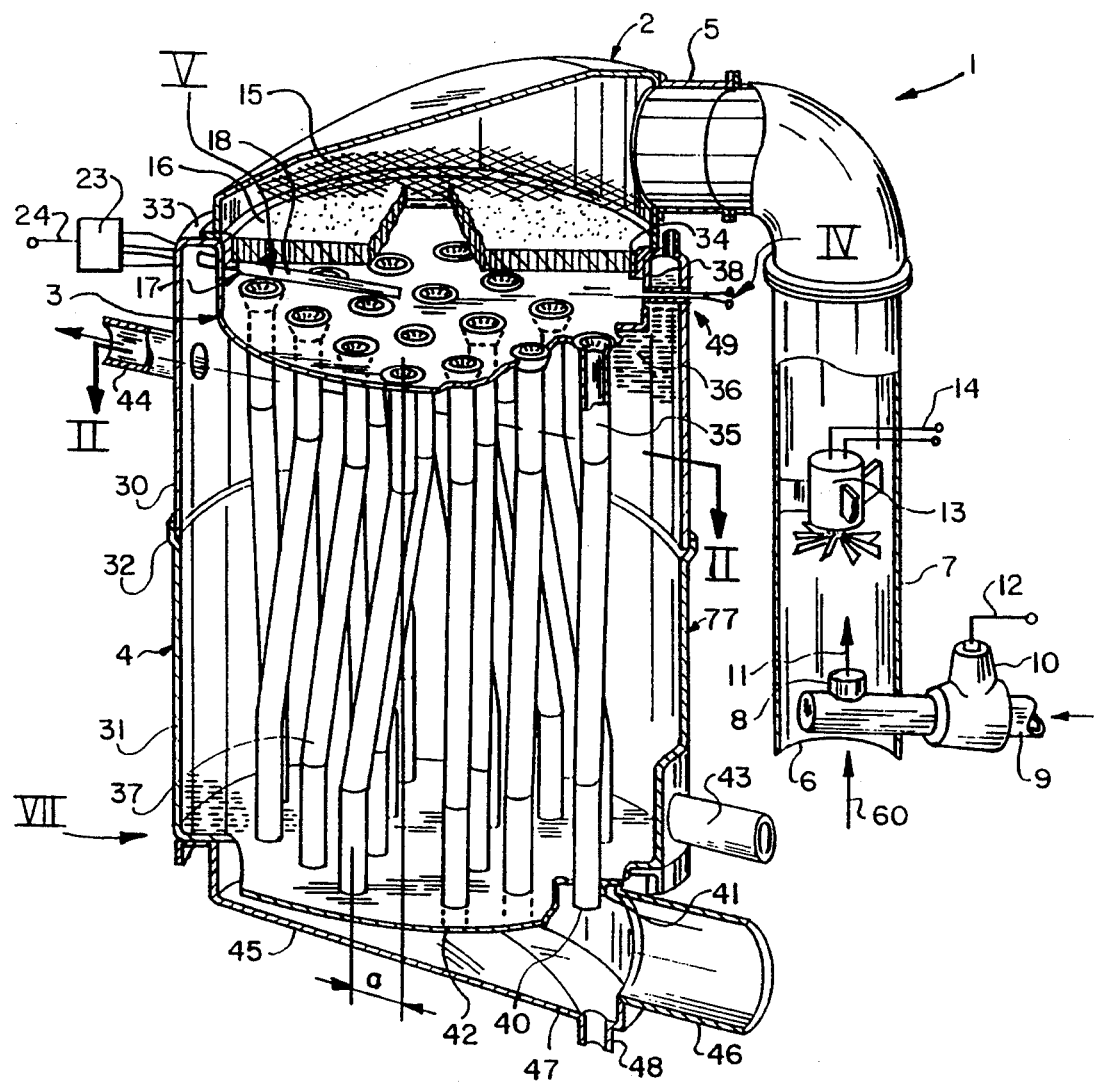

United States Patent [19]
Dalhuisen

[11] Patent Number: 5,338,184
[45] Date of Patent: Aug. 16, 1994

[54] GAS BURNER SYSTEM, GAS BURNER AND A METHOD FOR COMBUSTION CONTROL

[75] Inventor: Peter B. Dalhuisen, Ugchelen, Netherlands

[73] Assignee: P. B. Dalhuisen Gasresearch Apeldoorn B.V., Ugchelen, Netherlands

[21] Appl. No.: 64,021
[22] PCT Filed: Nov. 19, 1991
[86] PCT No.: PCT/NL91/00232
§ 371 Date: May 19, 1993
§ 102(e) Date: May 19, 1993
[87] PCT Pub. No.: WO92/08930
PCT Pub. Date: May 29, 1992

[30] Foreign Application Priority Data
Nov. 19, 1990 [NL] Netherlands ............ 9002522

[51] Int. Cl.$^5$ .................................. F23H 5/00
[52] U.S. Cl. .................................. 431/12; 122/17; 122/114; 431/7; 431/76; 431/328
[58] Field of Search ............ 122/109, 114, 17, 18; 431/326, 328, 329, 76, 2, 7, 12; 236/15 E

[56] References Cited

U.S. PATENT DOCUMENTS

| | | | |
|---|---|---|---|
| 1,907,736 | 5/1933 | Cheetham et al. | 122/114 X |
| 2,210,830 | 8/1940 | Bernhard | 122/156 |
| 4,271,789 | 6/1981 | Black | 122/16 |
| 5,158,448 | 10/1992 | Kawasaki et al. | 431/328 X |
| 5,201,807 | 4/1993 | Liljenberg et al. | 122/18 |

FOREIGN PATENT DOCUMENTS

| | | |
|---|---|---|
| 0154361 | 9/1985 | European Pat. Off. |
| 0271434 | 6/1988 | European Pat. Off. |

*Primary Examiner*—Edward G. Favors
*Attorney, Agent, or Firm*—Webb Ziesenheim Bruening Logsdon Orkin & Hanson

[57] ABSTRACT

The invention relates to a gas burner system with at least one gas burner comprising: i) a mixing chamber (2) for supplying fuel gas and air; ii) a closed combustion chamber (3) located under the mixing chamber (2) and separated therefrom by a ceramic burner plate (16); iii) a jacket (30, 31) surrounding the combustion chamber (3) and heatable by radiation with an inlet (43) and an outlet (44) for liquid for heating, which jacket (30, 31) is provided with standing fire tubes (35) connecting onto the combustion chamber (3); iv) an outlet (46) for combustion gases; and v) combustion control means (17) situated in the combustion chamber (3) in the vicinity of the burner plate (16) which are connected to a control system. The invention relates further to a gas burner and to a method for controlling the combustion of a mixture of fuel gas and air in a combustion chamber which is provided with a ceramic burner plate, and a redox sensor with setting means for setting the temperature of the redox sensor, comprising: i) setting the redox sensor temperature $T_1$ which lies below the ignition temperature $T_o$ of the mixture; ii) flushing the combustion chamber with air, iii) setting a redox sensor temperature $T_2$ which lies above $T_o$; iv) supplying the mixture; and v) changing the supply of fuel gas and/or air subject to the generated redox sensor signal S.

12 Claims, 4 Drawing Sheets

GAS BURNER SYSTEM, GAS BURNER AND A METHOD FOR COMBUSTION CONTROL

The present invention relates to a gas burner, to a gas burner system in which such a gas burner is used and to a method for controlling the combustion of a mixture for burning consisting of fuel gas and air.

By means of the present invention it is possible, depending on the prevailing conditions, that the ratio of fuel gas and air in the mixture is controlled such that the quality of the combustion is optimal, i.e. a qualitative control on a low CO emission with a relatively low excess of air (about 5 to 10%). An improved output is thereby realized with the formation of a relatively large amount of condensed water. The discharge of $NO_x$ is moreover reduced. Another important aspect of the invention is that the invention can be applied with any type of fuel gas without adaptations of the gas burner or the system, and results in an optimal, almost complete combustion.

EP-A-154,361 describes a gas burner system in which combustion control means, in the form of a redox sensor, are used for controlling the combustion in a combustion chamber provided with a ceramic burner plate. A drawback to this system is that the sensor can be exposed over a longer period of time to reducing gases such as CO and $CH_4$, by which the sensor becomes poisoned. This system moreover has a configuration such that the heat transfer substantially takes place through convection. The temperature and the oxygen concentration in the vicinity of the sensor can thereby fluctuate and thereby adversely affect the sensitivity and accuracy of the sensor.

The present invention has for its object to provide a gas burner and a gas burner system wherein in addition to the above-mentioned advantages the heat transfer takes place to considerable extent, i.e for more than 50%, preferably more than 55% and more preferably 60% and more by means of radiation.

In accordance with the invention this is achieved with a gas burner system according to the invention having at least one gas burner according to the invention, comprising:
i) a mixing chamber for supplied fuel gas and air;
ii) a closed combustion chamber located under the mixing chamber and separated therefrom by a ceramic burner plate;
a jacket surrounding the combustion chamber and heatable by radiation with an inlet and an outlet for liquid for heating, which jacket is provided with standing fire tubes connecting onto the combustion chamber;
an outlet for combustion gases; and
combustion control means located in the vicinity of the burner plate in the combustion chamber and connected to a control system.

The combustion control means preferably comprise a redox sensor, such as a Figaro Combustion Monitor Sensor, CMS 301 or 302 from Figaro Engineering Inc. This sensor comprises a sintered, metal oxide-comprising semiconductor material that substantially consists of tin dioxide.

This redox sensor preferably comprises at least one spiral filament and means with which the spiral filament can be adjusted to two different glow temperatures. It is thus possible to control the operation of the gas burner at a temperature such that explosions are avoided in the case of the presence of a combustible mixture and, after determining good operation at a higher glow temperature and allowing a combustible mixture to be supplied, the combustion is started.

Since the heat transfer takes place to a considerable extent by means of radiation, the surface heated by radiation can be enlarged if more preferably the standing fire tubes are curved sideways in the jacket.

The system and the gas burner can be protected against irregular combustion or cessation of the combustion by connection of a mg sensor to the combustion chamber.

The output of the system and the gas burner can be further increased by utilizing the temperature of the combustion gas leaving the fire tubes for further generation of heat. It is therefore recommended that an indirect heat exchanger through which fire tubes pass is connected to the water casing.

Another aspect of the invention relates to a control method for combustion of a mixture of fuel gas and air for burning, wherein use is made of a redox sensor. The operation of the gas burner can herein be controlled when this method comprises:
setting the redox sensor temperature $T_1$ which lies below the ignition temperature $T_0$ of the mixture;
ii) flushing the combustion chamber with air;
iii) setting a redox sensor temperature $T_2$ which lies above $T_0$;
iv) supplying the mixture; and
v) changing the supply of fuel gas and/or air subject to the generated redox sensor signal S.

During operation the quality of the combustion is preferably controlled by changing the amount of air in the mixture of fuel gas and air. This is preferably done in that in step v) the supply of air is reduced if the signal S approaches a minimum value $S_{min}$, and in that in step v) the supply of air is increased if the signal S approaches a maximum value $S_{max}$. Starting up the burner system takes place when after step ii), step iii) follows if the signal S falls from $S_1$ to $S_2$, and further when after step iii), step iv) follows if the signal S rises from $S_2$ to $S_3$, wherein $S_3$ is greater than $S_1$. The operating state for combustion is reached in that the supply of mixture is maintained if in step iv) the signal S falls after reaching a value $S_{max}$.

Mentioned and other features of the gas burner system, the gas burner and the combustion method according to the invention will be described hereinafter in more detail on the basis of an embodiment which is only given by way of an example, while reference is made to the annexed drawing.

Figure 2:
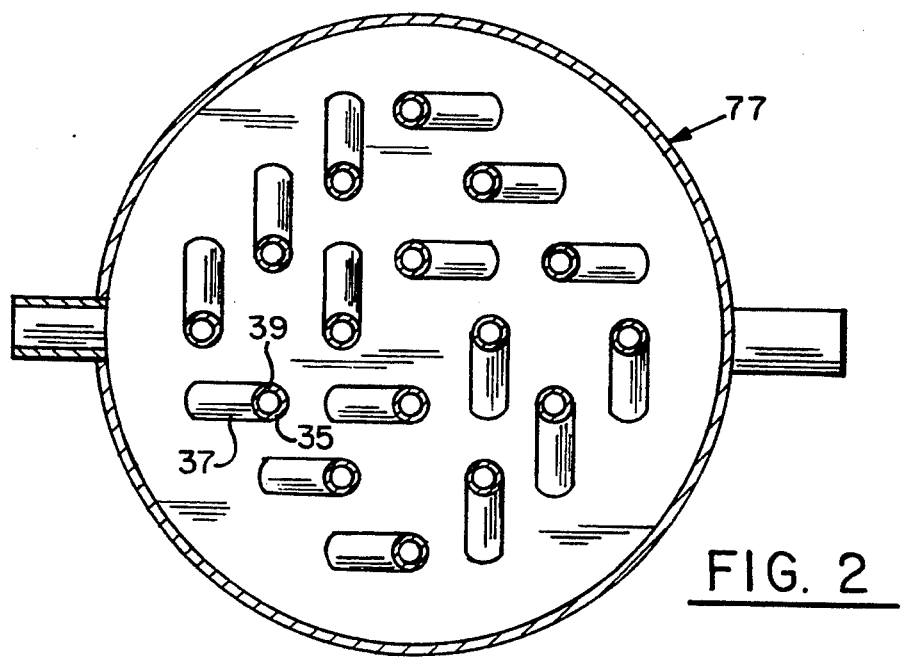
Figure 3:
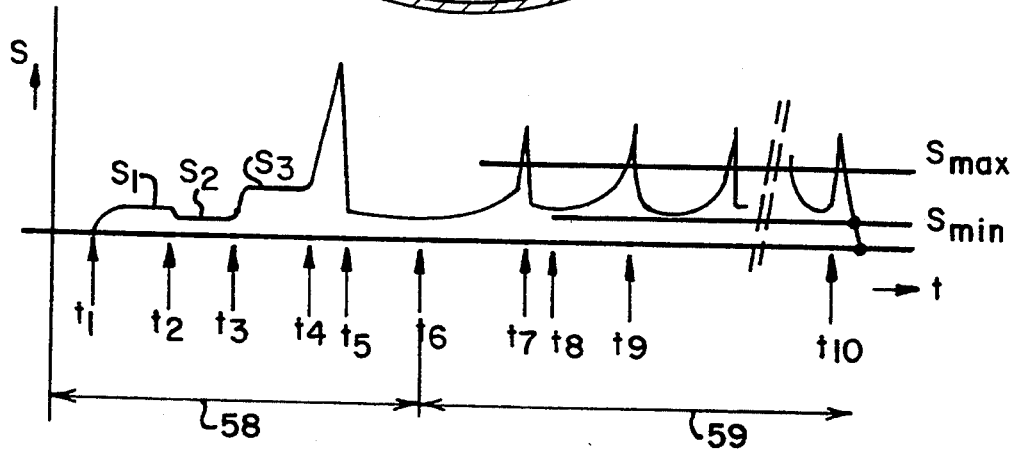
Figure 4:
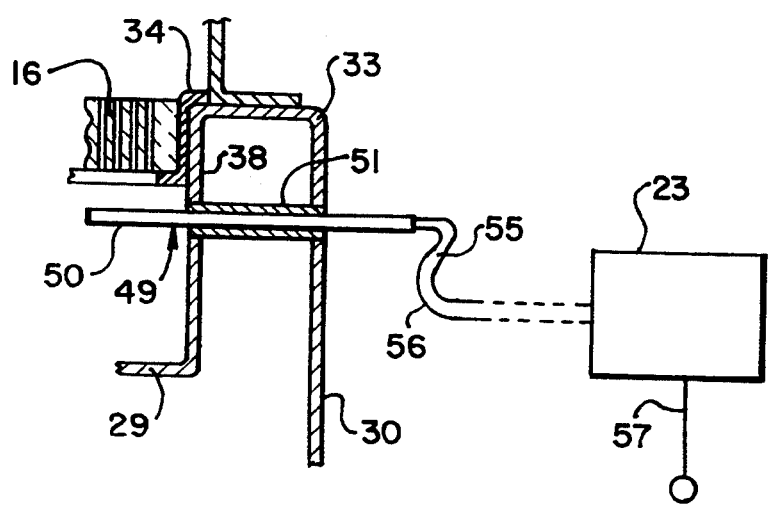
Figure 5:
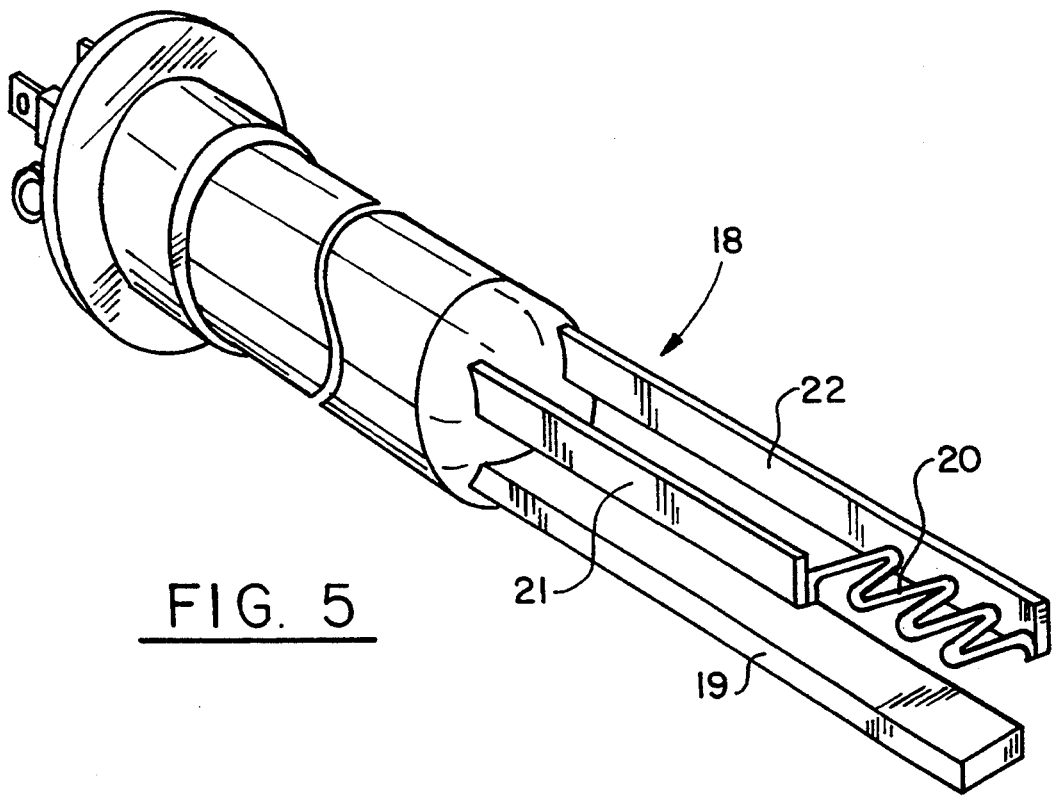
Figure 6:
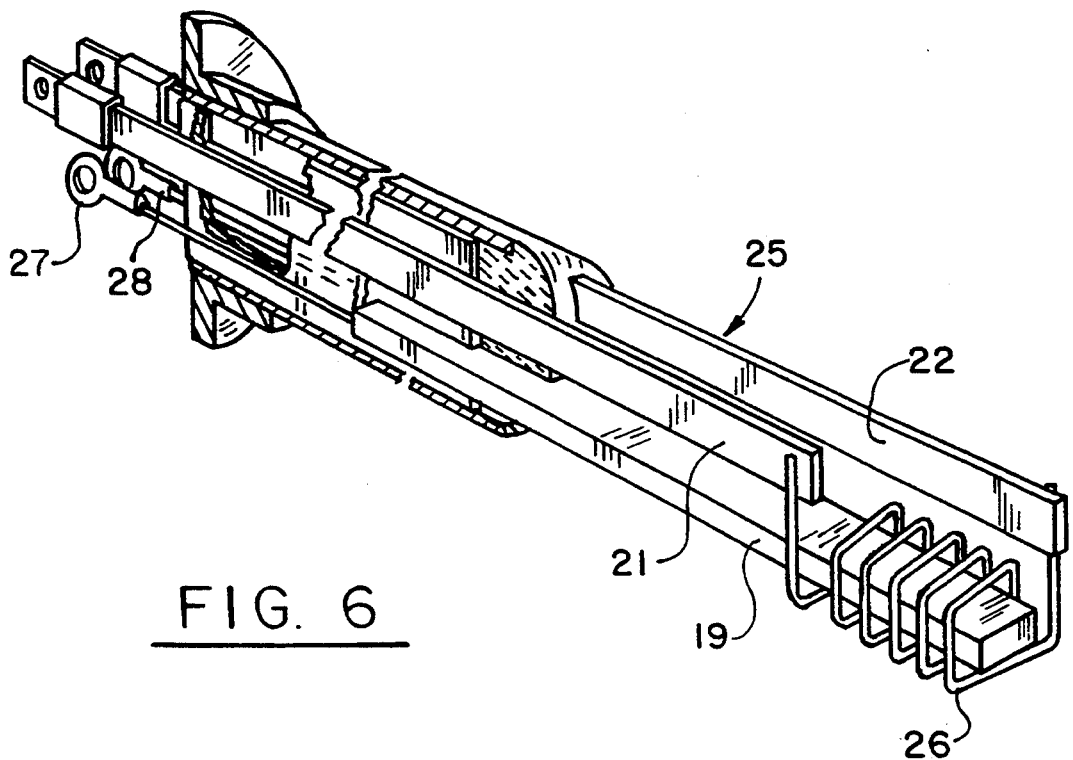
Figure 7:
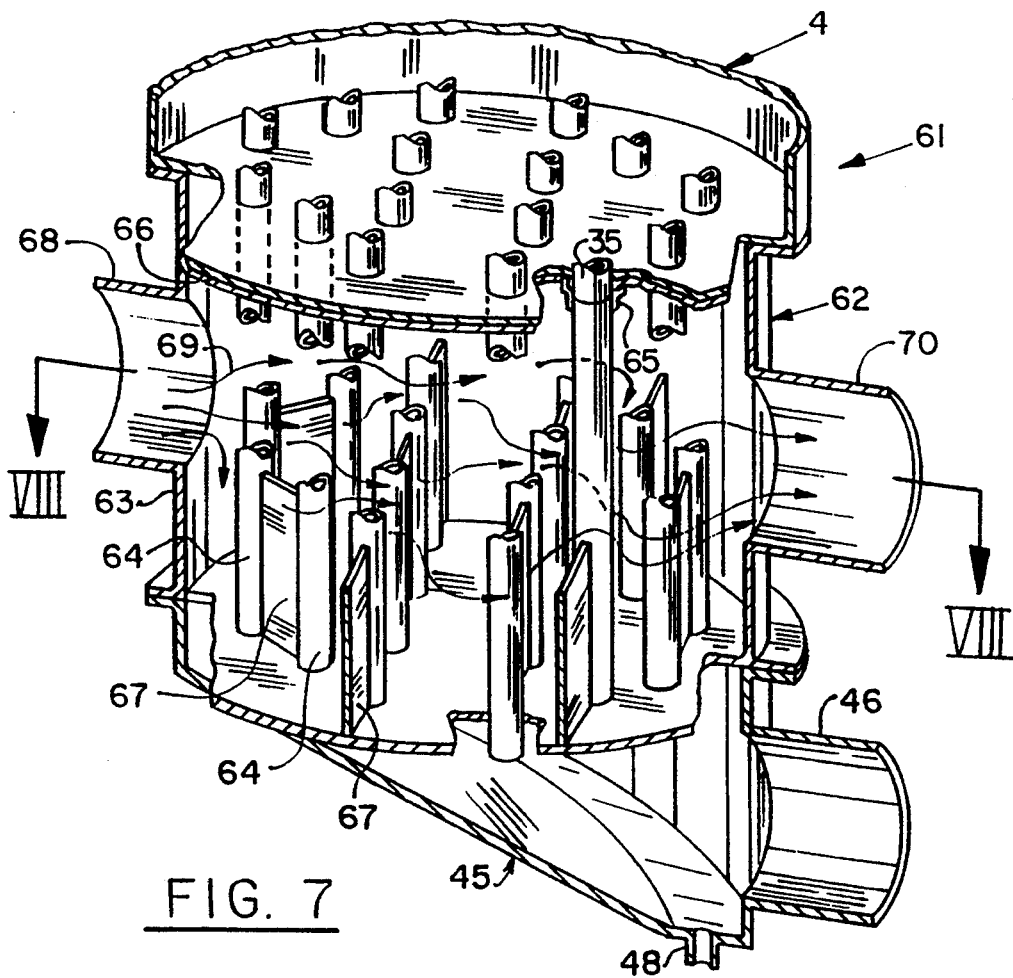
Figure 8:
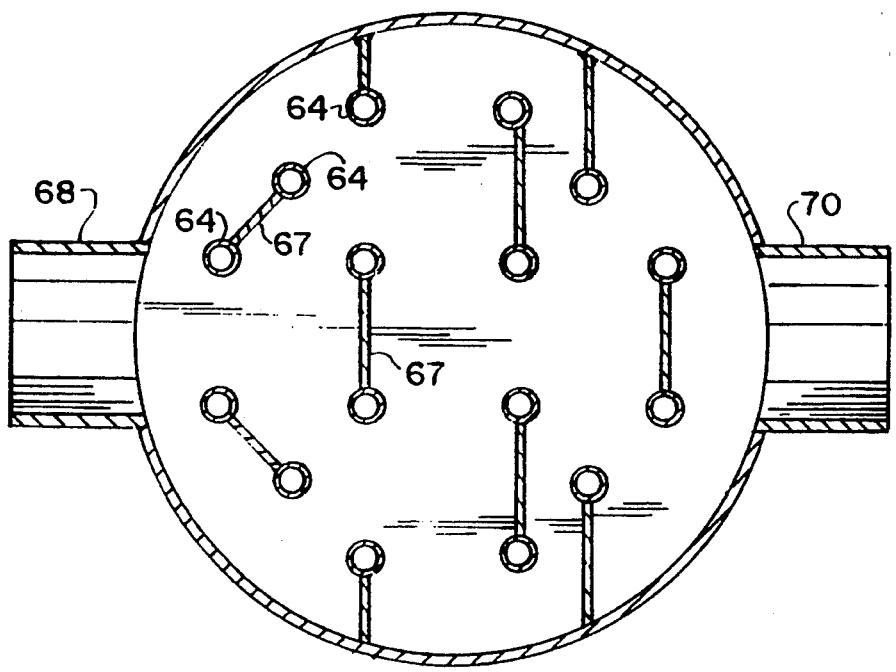

In the drawing:
FIG. 1 shows a partially broken away, perspective view of a gas burner according to the invention;
FIG. 2 shows a section across the line II—II from FIG. 1;
FIG. 3 is a graphic depiction of the signal generated by the sensor during the starting and operating situation;
FIG. 4 shows on a larger scale detail IV from FIG. 1;
FIG. 5 shows on a larger scale detail V from FIG. 1;
FIG. 6 shows a variant of the detail from FIG. 5;
FIG. 7 shows a variant of detail VII from FIG. 1; and
FIG. 8 shows a section along the line VIII—VIII from FIG. 7.

FIG. 1 shows a gas burner 1 according to the invention which, together with a control system (not shown here), forms a gas burner system according to the invention. This gas burner system can comprise one or more gas burners 1 according to the invention and can for example be used for central heating and hot water provision. The gas burners 1 according to the invention can herein be connected in parallel or in tandem.

The gas burner 1 according to the invention comprises a mixing chamber 2, a combustion chamber 3 and a heat exchanger 4 which are arranged one on the other.

A central heating unit placed in the attic and two hot water provisions for bathroom and kitchen each provided with a gas burner 1 according to the invention can also be controlled with one control system.

The mixing chamber 2 is provided with an inlet 5 onto which connects a hanging pipe 7 open at the underside 6. Debouching into the pipe 7 in the vicinity of the bottom end 6 is a nozzle 8 with which fuel gas 11 can be supplied via a feed conduit 9 and a controllable valve 10, when the valve 10 is opened. The valve 10 is operated via a control line 12 which is connected to the control system (not shown).

Further accommodated in the pipe 7 is an axial fan 13 whereof the delivery side is directed toward the mixing chamber 2, and which is connected to the control system via the control lines 14.

Further arranged in the mixing chamber 2 is a copper mixing gauze 15 to stimulate the mixing of fuel gas and air and to prevent flame blow-back from the combustion chamber 3 into the mixing chamber 2. A uniform pressure distribution is moreover furthered over the surface of a ceramic burner plate 16 which separates the mixing chamber 2 from the combustion chamber 3. For example a Tennaglo T (trademark) can be used as ceramic burner plate.

Combustion control means 17 comprising a redox sensor 18 is arranged in the substantially cylindrical combustion chamber at a short distance from the burner plate 16. The distance to the plate 16 is preferably 2 to 5 mm.

The sensor 18 is shown in more detail in FIG. 5. The sensor 18 (Figaro CMS-202) comprises a sensor part 19 in which is arranged sintered $SnO_2$ mixed with catalyst. This sensor part 19 is sensitive to changes in the concentration of reducing gases at a temperature of 400°–1100° C.

The sensor 18 further comprises a spiral filament 20 arranged between terminals 21 and 22. These terminals 21 and 22 are joined to a control unit 23 with which the spiral filament 20 can be set to two different temperatures $T_1$ and $T_2$. The control unit 23 is in turn connected via a control line 24 to the control system.

FIG. 6 shows a variant of the sensor 18. In this case the sensor 25 has a spiral filament 26 disposed between the terminals 21 and 22 which is wound round the sensor part 19. The terminals 21 and 22 are again connected to the control unit 23, while the terminals 27 and 28 of the sensor 25 are directly joined to the control system.

The cylindrical combustion chamber 3 is bounded at the sides and at the bottom by a lowered bottom part 29 of a cylindrical first jacket part 30 which forms with another cylindrical jacket part 31 the jacket of the heat exchanger 4. The jacket parts 30 and 31 are joined at an overlapping seam 32. The mixing chamber 2 is fixed to and rests on a bottom edge 33, wherein the ceramic burner plate 16 rests in a profile ring 34.

Debouching into the bottom part 29 is a large number of fire tubes 35 which pass through the water casing 77 filled with water 36. The fire tubes have a sideways bending portion 37. The combustion chamber is thus provided with a maximum surface area heated by radiation which consists of the standing edge 38, the bottom part 29 and the bent fire tube portions 37.

As shown in FIG. 2, heat radiation which enters the fire tube 35 via an inlet 39 will not reach its outlet 40 because it will first encounter the bent portion 37 of the fire tube.

The fire tubes 35 are fixed at one side in the bottom part 29 and at the other side to a collar 41 of a bottom part 42 of the jacket part 31.

Water to be heated flows in via an inlet 43 and leaves the heat exchanger 4 via an outlet 44 lying at a high level.

The fire tubes 35 debouch into a combustion gas chamber 45 onto which debouches an outlet 46 for combustion gas. At the lowest point of a sloping bottom 47 of the combustion gas chamber 45 is an outlet 48 for condensed water that drips out of the fire tubes 35 into the combustion gas chamber 45.

FIG. 4 shows a measuring sensor 49 according to the invention. The sensor 49 comprises a NiCr/NiAl thermocouple 50 which extends through a tube part 51 into the combustion chamber to a point close to the burner plate 16. The presence of a flame on the burner plate 16 during starting up and during operation is detected with the measuring sensor 49. The signal from the measuring sensor 49 is transmitted through the control lines 55, 56 to a control unit 23 which is in turn connected via a control line 57 to the control system.

Instead of a separate measuring sensor 49 the measuring sensor can be integrated into the sensor 18 as shown in FIGS. 5 and 6.

The combustion method which can be performed with the gas burner 1 according to the invention will be elucidated in more detail hereinbelow with reference to FIG. 3 wherein the signal S generated by the sensor is shown as a function of time t for a start-up period 58 and an operating period 59.

At start-up the valve 10 is closed and the fan 13 is switched off. At time $t_1$ the sensor 25 is heated with the spiral filament 26 by the control system via the control unit 23 to a redox sensor temperature $T_1$ (for example 400° C.). The sensor 25 will generate a signal $S_1$. The fan 13 is started at time $t_2$. Ambient air 60 flows in, whereby the temperature of the sensor falls, the signal therefrom falling to $S_2$, unless fuel gas is supplied as a result of a leaking valve 10 or as a result of a mixture still present in the mixing chamber 2. This would produce an increase in the signal S which would cause the control system to decide to discontinue the start-up procedure.

After a flushing period, the sensor 25 will at $t_3$ be brought with the spiral filament 26 to a higher temperature $t_2$ (800°–1000° C.), a temperature at which a mixture for combustion will ignite. Due to this higher temperature the sensor will generate a signal $S_3$ greater than $S_2$ and greater than $S_1$.

The gas valve 10 will subsequently be opened at $t_4$, whereafter the mixture of fuel gas and air will flow via the burner plate into the combustion chamber and will be ignited by the hot sensor 25/spiral filament 26. The sensor signal will increase and at $t_5$ the heating of the spiral filament 26 will be interrupted, whereby the start-up period 58 is concluded.

As a result of the combustion the concentration of reducing gas in the combustion chamber 3 will decrease and thereby also the signal S from the sensor.

The supply of air will for example be reduced from $t_6$ to an air excess of n=1.05, wherein a maximum of 50 ppm CO and 16 ppm $NO_x$ occurs in the flue gas that will leave the outlet 46.

When the air excess is further lowered by either reducing the speed of revolution of the fan 13 or by increasing the supply of gas via the valve 10, the signal S will increase. When the signal S approaches a maximum value $S_{max}$, or exceeds it (corresponding to about 30 ppm CO), the air excess will be enlarged, for example by increasing the speed of revolution of the fan 13 at $t_7$. The signal S will once again decrease and when it approaches an $S_{min}$ (for example 20 ppm CO) the speed of revolution of the fan 13 will be decreased at $t_8$ until it is increased at $t_9$. It will be apparent that in this operating situation the combustion is optimally regulated within narrow limits for the CO concentration in the combustion gas. When the heating requirement comes to an end, the gas valve 10 is then closed at $t_{10}$ and the fan 13 is stopped when the signal from the sensor reaches a zero value.

FIGS. 7 and 8 show a variant of a gas burner 61 according to the invention wherein a second heat exchanger 62 connects to the heat exchanger 4. The second heat exchanger 62 comprises a cylindrical housing 63 with exchanger pipes 64 which are provided at their top end with a collar 65 of a top part 66 in which the coupling with a corresponding fire tube 35 takes place. Between the exchanger pipes 64 are arranged partitions 67 whereby air 69 for feeding in via an inlet 68 passes through the heat exchanger 62 via a labyrinth and, heated on the pipes 64 and the partitions 67, leaves the heat exchanger 62 via the outlet 70.

FIG. 7 shows clearly that the second heat exchanger 62 is arranged between the heat exchanger 4 and the combustion gas chamber 45.

The second heat exchanger 62 can be added later to the gas burner 1, without adaptations to the control and protection being necessary. The higher resistance created in the gas burner 1 by mounting the heat exchanger 62 does have an affect on the output of the fan 13, but this is automatically brought to the correct value again via the sensor control.

It will be apparent from the above that the gas burner system and the gas burner according to the invention can be used for burning a great variety of fuel gases with optimum output and with a minimal emission of harmful combustion products such as CO, $NO_x$ and hydrocarbons. The control and protection of the burner are good and inexpensive. The gas burner and the gas burner system are easy to maintain and less sensitive to varying chimney draught, pollution and ageing.

Finally, it is possible to record the energy consumption of the system or the gas burner by recording the switching operations carried out by the control system.

I claim:

1. A gas burner system with at least one gas burner comprising:
   i)
   i) a mixing chamber for supplied fuel gas and air;
   ii) a closed combustion chamber located under the mixing chamber and separated therefrom by a ceramic burner plate;
   iii) a jacket surrounding the combustion chamber and heatable by radiation with an inlet and an outlet for liquid for heating, which jacket is provided with standing fire tubes connecting onto the combustion chamber;
   iv) an outlet for combustion gases; and
   v) combustion control means situated in the combustion chamber in the vicinity of the burner plate which is connected to a control system.

2. The system as claimed in claim 1, wherein the combustion control means is a redox sensor.

3. The system as claimed in claim 2, wherein the redox sensor includes at least one spiral filament and adjustment means for adjusting the spiral filament to two different temperatures.

4. The system as claimed in claim 1, wherein the standing fire tubes are bent sideways in the jacket.

5. The system as claimed in claim 1, further including a sensor connected to the combustion chamber.

6. The system as claimed in claim 1, further including an indirect heat exchanger, through which fire tubes pass, connected to a water casing.

7. A method for controlling the combustion of a mixture of fuel gas and air in a combustion chamber which is provided with a ceramic burner plate, and a redox sensor with setting means for setting the temperature of the redox sensor, said method comprising the steps of:
   i) setting a first redox sensor temperature $T_1$ below the ignition temperature $T_0$ of the mixture;
   ii) flushing the combustion chamber with air;
   iii) setting a second redox sensor temperature $T_2$ above $T_0$;
   iv) supplying the mixture; and
   v) changing the supply of fuel gas and/or air subject to the generated redox sensor signal S.

8. The method as claimed in claim 7, wherein in step v) the supply of air is reduced when the signal S approaches a minimum value $S_{min}$.

9. The method as claimed in claim 8, wherein in step v) the supply of air is increased when the signal S approaches a maximum value $S_{max}$.

10. The method as claimed in claim 7, wherein after step ii), step iii) follows when the signal S falls from $S_1$ to $S_2$.

11. The method as claimed in claim 7, wherein after step iii), step iv) follows when the signal S rises from $S_2$ to $S_3$, wherein $S_3$ is greater than $S_1$.

12. The method as claimed in claim 7, wherein the supply of mixture is maintained if in step iv) the signal S falls after reaching a value $S_{max}$.

* * * * *